US009016005B2

(12) United States Patent
García Maestre et al.

(10) Patent No.: US 9,016,005 B2
(45) Date of Patent: Apr. 28, 2015

(54) PROCESS AND UNIT FOR THE ATTACHMENT OF A WIND TURBINE'S TOWER TO A FOUNDATION AND WIND TURBINE INCORPORATING SAID UNIT

(75) Inventors: Iván García Maestre, Navarra (ES); Eduardo Azanza Ladrón, Navarra (ES); Koldo Larumbe Fernandino, Navarra (ES); Carlos Cerdán Martínez, Navarra (ES); Teresa Arlabán Gabeiras, Navarra (ES); Javier Ciáurriz Martín, Navarra (ES); Javier Fernández De Manzanos, Navarra (ES); José Miguel García Sayés, Navarra (ES); Miguel Nuñez Polo, Navarra (ES)

(73) Assignee: Acciona Windpower, S.A., Navarra (ES)

( * ) Notice: Subject to any disclaimer, the term of this patent is extended or adjusted under 35 U.S.C. 154(b) by 0 days.

(21) Appl. No.: 13/490,151

(22) Filed: Jun. 6, 2012

(65) Prior Publication Data

US 2013/0125480 A1  May 23, 2013

(30) Foreign Application Priority Data

Nov. 17, 2011 (ES) .................................. 201131851

(51) Int. Cl.
  *E04B 2/82*  (2006.01)
  *E02D 27/42*  (2006.01)
  *E04H 12/34*  (2006.01)

(52) U.S. Cl.
  CPC .............. *E02D 27/42* (2013.01); *E04H 12/347* (2013.01)

(58) Field of Classification Search
  USPC ................. 52/126.1, 126.6, 126.7, 295–297, 52/742.14, 742.15, 745.04; 403/231, 232
  See application file for complete search history.

(56) References Cited

U.S. PATENT DOCUMENTS

| 2,540,622 | A | * | 2/1951 | Langenberg | 52/293.3 |
| 3,963,210 | A | * | 6/1976 | Macklin | 249/210 |
| 5,533,835 | A | * | 7/1996 | Angelette | 405/229 |
| 5,678,382 | A | * | 10/1997 | Naito | 52/745.21 |

(Continued)

FOREIGN PATENT DOCUMENTS

| CN | 102095052 | 6/2011 |
| ES | 2319324 | 9/2006 |

(Continued)

*Primary Examiner* — Jeanette E Chapman
*Assistant Examiner* — Daniel Kenny
(74) *Attorney, Agent, or Firm* — Blakely Sokoloff Taylor & Zafman LLP

(57) ABSTRACT

The invention describes a process and a unit, both enabling to attach a wind turbine tower to a foundation, as well as describes also a wind turbine incorporating the unit. The process features a stage of installation of a support element for the transmission of stresses from the tower to the foundation, followed by a stage of levelling the support element and pouring foundation concrete up to the support element's lower side so that the lower side is adhered to the poured concrete once it has set. The unit comprises at least one support element.

11 Claims, 2 Drawing Sheets

(56) References Cited

U.S. PATENT DOCUMENTS

| | | | |
|---|---|---|---|
| 7,841,143 B2 * | 11/2010 | Jensen et al. | 52/296 |
| 8,161,698 B2 * | 4/2012 | Migliore | 52/295 |
| 2006/0260232 A1 * | 11/2006 | Crawford et al. | 52/295 |
| 2008/0302038 A1 | 12/2008 | Wobben | |
| 2009/0044482 A1 | 2/2009 | Tooman | |
| 2011/0131899 A1 | 6/2011 | Voss et al. | |

FOREIGN PATENT DOCUMENTS

| | | |
|---|---|---|
| WO | WO-0043599 | 7/2000 |
| WO | WO-2008003749 | 1/2008 |
| WO | WO-2011047723 | 4/2011 |

* cited by examiner

STATE OF THE ART

PROCESS AND UNIT FOR THE ATTACHMENT OF A WIND TURBINE'S TOWER TO A FOUNDATION AND WIND TURBINE INCORPORATING SAID UNIT

CROSS-REFERENCE TO RELATED APPLICATIONS

The present patent claims priority to Spanish Application No. 20113185, filed Nov. 17, 2011.

FIELD OF THE INVENTION

The object of the invention is a process enabling the attachment of a wind turbine tower to a foundation, as well as the attachment unit enabling the aforementioned attachment between the tower and the foundation, and the wind turbine itself which incorporates said attachment unit.

BACKGROUND

The objective of wind energy is to generate electricity from the wind through wind turbines with the maximum possible efficiency and the minimum cost. The most spread configurations of wind turbines imply the use of one tower for the installation of the rotor at some predetermined elevation relative to the ground.

These towers are designed to withstand the set of reactions generated as a consequence of the loads to which both the wind turbine's rotor and the nacelle are subjected. The ideal position of the rotor to prevent the ground effect together with the blade diameters cause the optimal height at which it should be placed to increase as the wind turbine's electric power increases. In these machines with large power it is common to use towers with a height greater than 100 meters.

The attachment area, where the tower is attached to the foundation is one of the critical design points of the wind turbine and it has an impact in the latter's structural integrity.

The manufacturing of attachments between the tower's base and the foundation is known in the state of the art, said manufacturing essentially comprising the following steps:

First, a foundation hole is made in which a set of bolts, over which the first the first section of the tower is to be connected, are installed. Subsequently, concrete is poured in the hole in a way that the bolts protrude thereof.

Later, a first section of the tower is added over the already set concrete, wherein said concrete will be in contact with levelling metal sheets placed between the aforementioned first section and the foundation's concrete, said sheets intended for correcting the manufacturing dimensional tolerances of the foundation and correctly positioning the first section of the tower.

Once the first section of the tower has been levelled over the foundation, a cylindrical ring is installed on the perimeter surrounding the section and grout is poured over the ring. The grout collaborates in the attachment of the tower to the foundation establishing an adhesive connection between the grout and the tower on the upper section of the grout and between the grout and the foundation on the lower section of the grout.

Finally, once the grout has set, torque is applied to the bolts for tightening said bolts, the attachment being thereby finished.

Other methods for the attachment of the tower to the foundation are also known, in which a previous stage of making the hole is also executed which is then filled with concrete and from which the aforementioned bolts for connection to the tower's base also protrude. Subsequently, a support element is located over the foundation for the transmission of stresses from the tower to the foundation which may be, for example, made of steel or concrete, and which is placed over the concrete poured in the foundation hole once said concrete has set.

Subsequently, the levelling of the support element is carried out and then filling grout is poured in the space located between the support element and the foundation concrete, for the connection of the support element to the foundation. Once the filling grout has set, the upper side of the support element is connected to the tower's base through connection bolts which go through the aforementioned support element. In this case, an adhesive connection is established between the grout and the support element on the grout's upper side and between the grout and the foundation on the grout's lower side.

In both cases, the use of grout as an intermediate element and the reaction stresses generated at the tower's base determine, for a design of the predetermined tower section, the choice of the type of foundation for a specific location, since the strength mechanical capacity of the grout is limited and, at each location, the stresses vary depending on the winds associated to each aforementioned location. This creates the need to vary either the dimensions of the hole or its strength capacity for each type of tower.

Other disadvantages are the additional setting time that is implied by the use of grout, which increases the tower's construction time, as well as the influence of climatological conditions on the grout's setting time and also on the quality of the grout itself and, therefore, on the quality of the connection or even on the impossibility to be able to pour the grout.

Finally, another disadvantage of the use of grout are the associated quality problems, since the quality of the grout's seal is critical and difficult to control and even to unify for each wind turbine, since it depends, in addition to the climatological conditions previously discussed, on the experience of the workers or the existence of bubbles inside the grout which weaken the mix and which may appear as a consequence of a variation of the direction and speed of the grout in each area throughout the surface with regards to previous calculations, these parameters being difficult to control as they are affected by numerous variables.

In the first attachment method of a tower to the foundation known in the state of the art and described above, there is an additional given disadvantage: since the stage of levelling is applied to the tower's first section, it is necessary to use a high tonnage crane to move the first section during the levelling stage, thereby incurring in additional installation costs and the possibility of a damage to the components.

SUMMARY

The process for attachment of a wind turbine's tower to a foundation object of the invention comprises the aforementioned stages of:

performing a foundation hole for the subsequent pouring of foundation concrete inside, and placement in said foundation hole of a set of connection bolts for connecting the foundation to the tower.

However, the process is characterized by a sequence of stages in which the installation of a support element having capacities for stress transmission from the tower to the foundation is carried out first, followed by a stage of levelling the element, and when the aforementioned support element has been levelled, then the foundation concrete is poured into the hole.

The invention is applied in an equivalent manner both to onshore wind turbines, i.e., located on land, for which a hole is made on the ground for pouring the concrete, as well for offshore wind turbines, i.e. located at sea, for which formwork is performed on land defining the aforementioned hole in which the concrete is poured, this formwork being removed once the concrete has set, and the set concrete being transported to its final location at sea without the formwork.

More precisely, the process object of the invention is characterized in that it comprises the following stages:

installation of at least one support element for the transmission of stresses from the tower to the foundation, through the introduction of connection bolts through at least some orifices of the support element, levelling of the support element in the foundation's hole, attachment of the levelled support element to the connection bolts, subsequent to the attachment of the support element, pouring of the foundation concrete into the foundation hole to at least the lower side of the support element in such a way that the lower side is adhered to the poured concrete once it has set;

subsequent to the setting of the concrete, installation of at least one lower section of the tower over the levelled support element, and attachment of the tower's lower section to the connection bolts between the foundation and the tower.

In the event that the wind turbine is offshore, the installation of the support element, its levelling and attachment and the subsequent pouring of the concrete into the foundation hole or formwork would be carried out on land. Subsequently to the concrete setting, the assembly made up of the concrete, the bolts and the levelling element would be transported to its final location at sea, which would therefore entail an additional stage of transport of the aforementioned elements to the final location, and this final location would be where the installation and attachment of the tower's lower section would be carried out, as well as the installation of the set over an offshore platform.

The process object of the invention has an initial advantage of eliminating the need to use grout as the final filling element in the attachment between the lower tower section and the foundation, thereby solving the previously exposed technical problems. This occurs because the support element allows, firstly, performing the levelling over this element instead of over the tower's lower section, and secondly, since there is a direct attachment between the foundation concrete after its levelling, the support element is integrated into the foundation itself, establishing a connection through direct adhesion between the lower side of the support element and the foundation concrete, without the need for additional adhesives such as grout as in the aforementioned case of the state of the art, since this support element is pre-installed and levelled during the creation of the foundation, and it is not until a subsequent stage that the concrete is poured and, once set, the first section of the tower is installed directly over the upper surface, already levelled, of the support element. Two problems associated to the use of grout are therefore eliminated.

Another additional advantage presented by the invention is that it allows for the normalization and homogenization of the foundations for different structural loads to be borne, since the support element itself, which has the capacity to transmit stresses from the tower to the foundation, is the variable and modifiable part in the design of the attachment from the tower to the foundation, as the larger the dimensions of the element are, the greater is the allocation of stresses and therefore there is a decrease of the tensions observed in this attachment area. This entails an important reduction in the cost of manufacturing of the foundations.

In addition to the aforementioned, there are other advantages such as the improvement of the attachment quality, by avoiding the problems derived from the lack of quality as previously described due to the use of grout, since this is a critical element in the attachment, but whose final result depends on several variables, many of them impossible to control. Through the levelling of the support element which conforms the attachment unit and the process object of the invention the dimensional errors in the use of concrete, present at least as foundation material in any building solution of the wind turbine, are avoided and additionally, by establishing a connection through adhesion between the lower side of the support element and the foundation concrete, the previously described quality problems arising from the use of grout are eliminated.

Optionally, the stage of installing at least one support element in the connection bolts may be done before or after the stage of placing the connection bolts in the foundation hole. That is to say, the support element(s) may come previously installed in the set of bolts from the manufacturer or they may be installed in the tower's location, or in the land area where the foundation work is carried out in the case of offshore wind turbines, once the above set of bolts has been positioned in the foundation hole.

A unit for attachment of a wind turbine tower to a foundation is also an object of this invention, the foundation comprising concrete poured into a foundation hole and a set of connection bolts between the tower and the foundation embedded inside the concrete.

According to what was previously described, the unit is characterized in that it comprises:

at least one support element for the transmission of stresses from the tower to the foundation, said support element placed in an assembled position so that its upper side is in contact with the tower and its lower side is in contact with and adhered to the concrete poured into the foundation hole, the support element comprising at least some orifices for the bolts to go through, and levelling and attachment means for the support element to the connection bolts.

It is also an object of the present invention a unit for the attachment of a wind turbine to a foundation which is attainable through the previously described process and which incorporates the described technical characteristics of the unit for the attachment of a tower to a foundation.

According to the aforementioned, the unit for the attachment of a wind turbine tower to a foundation is also characterized in that the lower side of the support element is directly connected through adhesion to the concrete poured into the foundation hole, due to the setting of the concrete poured into the foundation hole being carried out when it is in contact with the support element.

Finally, a wind turbine incorporating the unit for the attachment of the wind turbine tower to the foundation as previously described is also an object of this invention.

BRIEF DESCRIPTION OF THE DRAWINGS

To complete the description that is being made and with the object of helping to a better understanding of the characteristics of the invention, in accordance with a preferred embodiment thereof, accompanying said description as an integral part thereof, is a set of drawings wherein, by way of illustration and not restrictively, the following has been represented.

DETAILED DESCRIPTION

Figure 1:
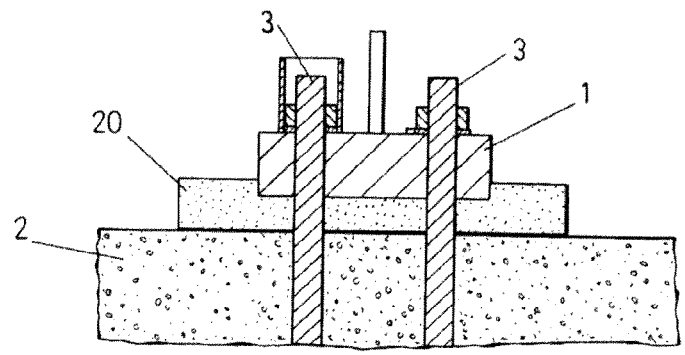
FIG. 1.—Shows a schematic section of an attachment between the tower and the foundation according to the state of the art.

FIG. 1 shows an example of an attachment between a lower section of a tower (1) and a foundation known in the state of the art. The tower (1) is installed over the foundation which is connected to the bolts (3) which are at the same time partially embedded in the foundation concrete (2). Around the base of the tower (1) there is a grout ring (20) which connects the tower (1) to the foundation. This solution has the disadvantages previously described.

Figure 3:
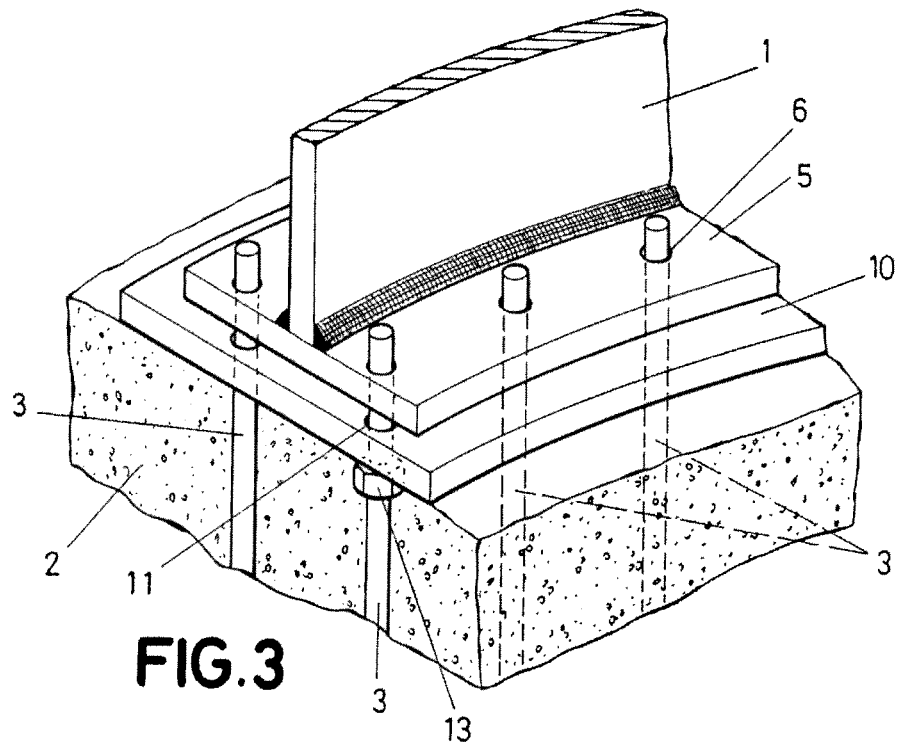
FIG. 3.—Shows a schematic section of an attachment between tower and foundation according to a first example of preferred embodiment of the levelling and attachment means of the support element.

FIG. 3 shows a preferred embodiment of an attachment unit according to the object of the invention, which is obtained following the process that was previously described. Represented in the figure are:

a set of connection bolts (3) for connecting the foundation to the tower (1), a support element (10) in contact with the tower (1) and in contact with the foundation concrete (2). The support element (10) comprises some orifices (11) for the connection bolts (3) to go through, and levelling and attachment means for the support element (10), comprising at least one threaded element (13) which is located in connection with the support element (10) and movable relative to the connection bolts (3), which are also threaded so that activation of the threaded element (13) varies the elevation of the support element's (10) orifices (11).

In this preferred embodiment of FIG. 3, the threaded elements (13) are located in contact with the lower side of the support element (10) and embedded in the foundation concrete (2).

This way, the stage of levelling the support element (10) comprises a stage for the regulation of the elevation of the support element's (10) orifices (11) until the support element (10) is levelled.

More precisely, in the preferred embodiment shown in FIG. 3, the threaded elements (13) are low resistance threaded elements (13), so that when the connection between the tower's (1) first section and the connection bolts (3) is carried out, the tension of the bolts (3) will lead to the rupture of the threaded elements (13) which will break due to the connection bolt's (3) traction, which will cause the threaded element (13) to collide against the support element (10), causing the threads thereof (13) to break, thus enabling traction of the connection bolt (3).

Figure 4:
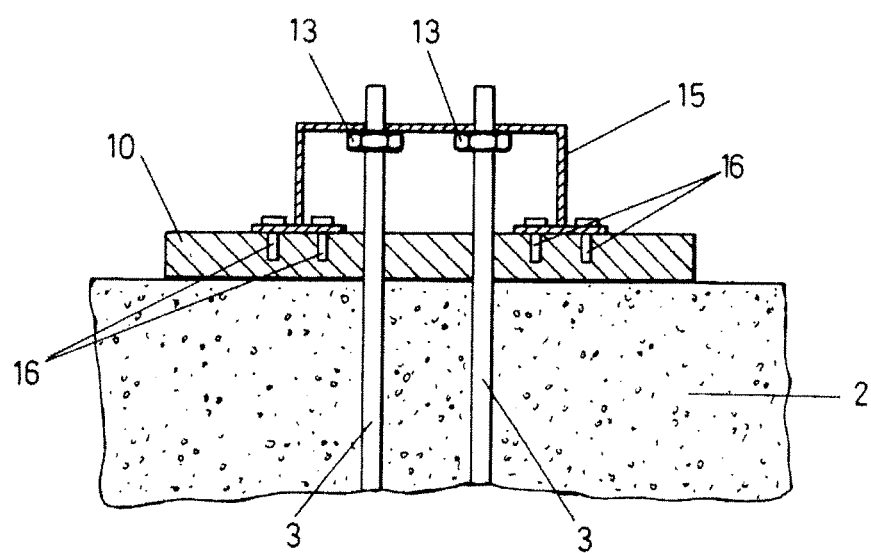
FIG. 4.—Shows a schematic section of an attachment between the tower and the foundation according to a second example of preferred embodiment of the levelling and attachment means of the support element.

A second preferred embodiment of the levelling and attachment means of the support element (10) is represented in FIG. 4, which also consist of at least one threaded element (13), in particular, there are two threaded elements (13) represented, located in connection with the support element (10). However, in this preferred embodiment, the threaded elements (13) are located in contact with an intermediate element (15) which is located also connected with the support element (10). This way, an actuation over the threaded elements (13), provokes said threaded elements (13) moving the intermediate element (15), which has a U shape and whose legs are placed attached through screws (16) to the support element (10), and thus through the screws (16) the support element (10) is moved. The advantage of this second embodiment is that once the support element (10) is attached, the levelling and attachment means are removable so that they may be able to be used for levelling in another tower, being therefore reusable.

The support element (10) could be made of a metallic material such as mechanized steel or made of a base of elastomeric material which has a great resilience capacity and reinforced with a metallic material, for example with embedded plates in its interior. This embodiment has the additional advantage of mitigating and absorbing land vibrations, in case they are located in seismic areas.

Additionally, in the case of the metallic support element (10), it may comprise a sheet of elastomeric material over its upper side which would be installed before the stage of the installation of the tower's (1) lower section over the support element (10).

Optionally, the support element (10) may consist of a disc or may be divided into partially annular configured sectors (14) to facilitate transportation and handling thereof (10).

There is also a preferred embodiment of the tower's (1) lower section represented in FIG. 3, which itself comprises a flange (5) with drills (6) for the introduction of connection bolts (3) and for clamping the lower section of the tower (1) to the support element (10) and the foundation.

Figure 2:
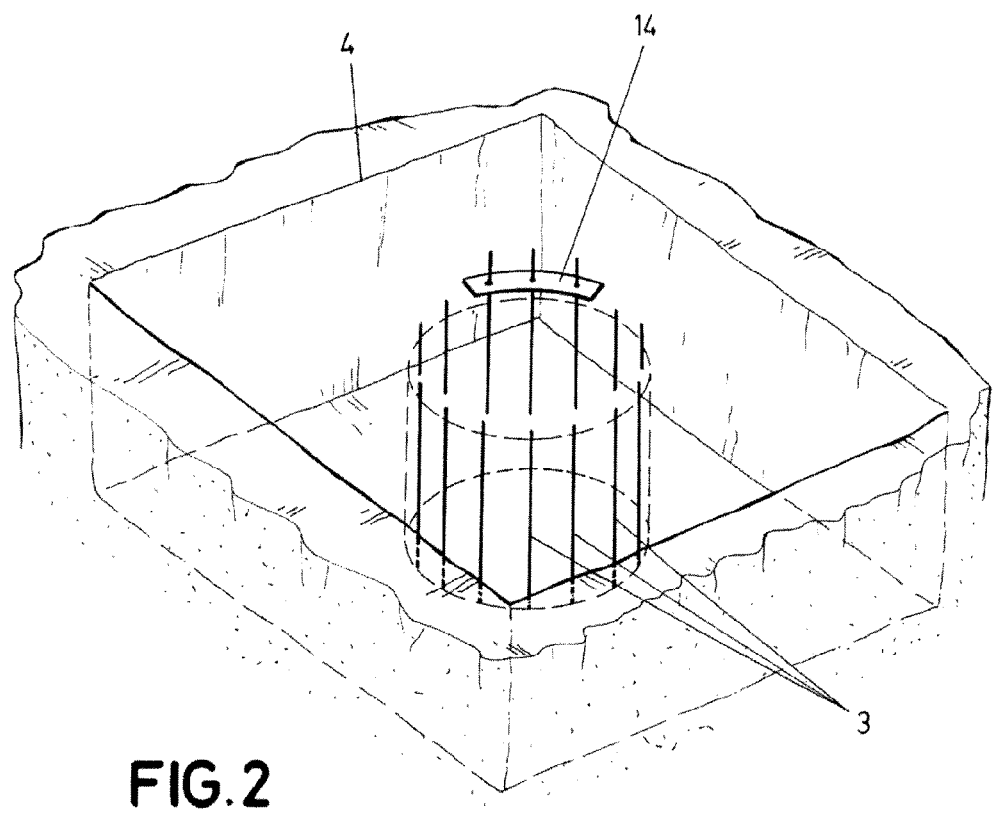
FIG. 2.—Shows a schematic perspective view of the foundation hole of an onshore wind turbine which incorporates a set of bolts and a support element located over them.

FIG. 2 shows a preferred embodiment of the stage in which the execution of positioning of, specifically, the partially annular configuration sectors (14) over the connection bolts (3) between the foundation and the tower (1) is performed. FIG. 2 shows the foundation hole (4) of an onshore wind turbine and the set of bolts (3) and the preferred embodiment in which the positioning of the partially annular configuration sectors (14) in the connection bolts (3) is carried out in the foundation hole (4). Optionally, the partially annular configuration sectors (14) may be previously installed in the set of connection bolts (3). It should be noted that in this stage the concrete (2) has not yet been poured into the hole (4).

For the levelling, each partially annular configuration sector (14) comprises at least three orifices (11) for the insertion of three bolts (3), therefore, through the action of the three threaded elements (13) previously described, the levelling and attachment of the partially annular configuration sectors (14) is carried out, as well as their (14) alignment.

The invention claimed is:

1. A process for the attachment of a wind turbine tower to a foundation, comprising the stages of:

creation of a foundation hole;

placement in the foundation hole of a set of connection bolts for connecting the foundation to the tower;

additionally comprising the following stages:

placement of at least one support element for the transmission of stresses from the tower to the foundation, by introducing the connection bolts through at least some orifices of the at least one support element;

levelling of the support element in the foundation's hole;

pouring of foundation concrete into the foundation hole up to at least the lower side of the levelled support element in a way that the lower side is adhered to the poured concrete once it has set;

subsequent to the setting of the concrete, placing at least one lower section of the tower over the levelled support element; and connection of the tower's lower section to the foundation and the levelled support element through the connection bolts.

2. The process of claim 1, wherein the stage of placement of at least one support element by introducing the connection bolts through at least some orifices of at least one support element, is made prior to the stage of placement of the connection bolts in the foundation hole.

3. The process of claim 1, wherein the stage of placement of at one support element by introducing the connection bolts through at least some orifices of at least one support element, is made subsequent to the stage of placement of the connection bolts in the foundation hole.

4. The process of claim 1, wherein the stage of levelling of the support element comprises a stage of regulation of the elevation of the orifices until the support element is levelled.

5. The process of claim 4, wherein the stage of the regulation of the elevation of the orifices of the support element comprises a stage of actuation on at least one threaded element movable with regard to the connection bolts which are also threaded, the threaded element being adjacent to the support element so that the support element is moved when the threaded element is actuated.

6. The process of claim 5, wherein the threaded element is placed in contact with the lower side of the support element.

7. The process of claim 5, wherein the support element is divided into partially annular configured sectors, each partially annular configured sector comprising at least three orifices for the levelling of each partially annular configured sector so that the levelling is made by actuating over the, at least, three associated threaded elements.

8. The process of claim 1, wherein the support element is divided into partially annular configured sectors.

9. The process of claim 1,
wherein the support element is metallic,
wherein on the upper side of the metallic support element a sheet of elastomeric material is installed before the stage of the placement of at least a lower section of the tower over the levelled support element.

10. The process of claim 1, wherein the support element comprises a base made of elastomeric material reinforced with a metallic material.

11. The process of claim 1, wherein the stage of connection of the tower's lower section to the foundation and the levelled support element through the connection bolts comprises the introduction of the connection bolts through holes located in a flange of the tower's lower section for clamping the tower's lower section to the support element and to the foundation.

\* \* \* \* \*

UNITED STATES PATENT AND TRADEMARK OFFICE
CERTIFICATE OF CORRECTION

| | |
|---|---|
| PATENT NO. | : 9,016,005 B2 |
| APPLICATION NO. | : 13/490151 |
| DATED | : April 28, 2015 |
| INVENTOR(S) | : Iván García Maestre et al. |

It is certified that error appears in the above-identified patent and that said Letters Patent is hereby corrected as shown below:

In the Claims,

Column 7, Claim 3, line 7, please delete "of at one" and insert --of at least one--.

Signed and Sealed this
Fifteenth Day of March, 2016

Michelle K. Lee
*Director of the United States Patent and Trademark Office*